US007152039B1

(12) United States Patent
Cheng et al.

(10) Patent No.: US 7,152,039 B1
(45) Date of Patent: Dec. 19, 2006

(54) METHODS AND SYSTEMS FOR CUSTOMER LIFECYCLE DEFINITION AND CATEGORIZATION

(75) Inventors: Chingwei Peter Cheng, Foster City, CA (US); Lee Sang, Pacifica, CA (US)

(73) Assignee: Oracle International Corporation, Redwood Shores, CA (US)

( * ) Notice: Subject to any disclaimer, the term of this patent is extended or adjusted under 35 U.S.C. 154(b) by 312 days.

(21) Appl. No.: 09/607,914

(22) Filed: Jun. 29, 2000

(51) Int. Cl.
*G06F 17/30* (2006.01)

(52) U.S. Cl. .............................. 705/10; 705/14; 705/26
(58) Field of Classification Search ................ 705/10, 705/8, 9, 14, 26
See application file for complete search history.

(56) References Cited

U.S. PATENT DOCUMENTS

| | | | | | |
|---|---|---|---|---|---|
| 5,041,972 | A | * | 8/1991 | Frost | 705/10 |
| 5,208,765 | A | * | 5/1993 | Turnbull | 702/84 |
| 5,638,457 | A | * | 6/1997 | Deaton et al. | 382/100 |
| 5,966,695 | A | * | 10/1999 | Melchione et al. | 705/10 |
| 5,974,399 | A | * | 10/1999 | Giuliani et al. | 705/14 |
| 6,044,357 | A | * | 3/2000 | Garg | 705/10 |
| 6,055,573 | A | * | 4/2000 | Gardenswartz et al. | 709/224 |
| 6,073,112 | A | * | 6/2000 | Geerlings | 705/14 |
| 6,078,891 | A | * | 6/2000 | Riordan et al. | 705/10 |
| 6,298,328 | B1 | * | 10/2001 | Healy et al. | 705/10 |
| 6,334,110 | B1 | * | 12/2001 | Walter et al. | 705/14 |
| 6,424,949 | B1 | * | 7/2002 | Deaton et al. | 705/10 |
| 6,430,539 | B1 | * | 8/2002 | Lazarus et al. | 705/10 |
| 6,622,126 | B1 | * | 9/2003 | McArdle et al. | 705/26 |
| 6,633,851 | B1 | * | 10/2003 | Engler et al. | 705/21 |
| 6,839,680 | B1 | * | 1/2005 | Liu et al. | 705/10 |
| 6,839,682 | B1 | * | 1/2005 | Blume et al. | 705/10 |

FOREIGN PATENT DOCUMENTS

| | | | |
|---|---|---|---|
| JP | 06012426 A | * | 1/1994 |
| JP | 09101984 A | * | 4/1997 |

OTHER PUBLICATIONS www.sas.com—Web site for marketing research software archived on Apr. 29, 1999.*
Evans, Joel and Berman, Barry, "Marketing", 1992, Macmillan Publihing, Fifth Edition.*

(Continued)

*Primary Examiner*—Catherine M. Tarae
(74) *Attorney, Agent, or Firm*—Young Law Firm, P.C.

(57) ABSTRACT

A computer-implemented method of categorizing a customer includes steps of selecting a measure on which the status of the customer is to be analyzed, selecting a calculation period and selecting a comparison method. A lifecycle factor may then be computed, the lifecycle factor being related to both the size and the growth of the customer according to the selected measure. Both the size and growth are determined over two selected calculation periods using the selected comparison method. Selected customers may then be categorized into one of a plurality of lifecycle stages by evaluating a plurality of categorization criteria, at least one of the plurality of categorization criteria including the computed lifecycle factor. For example, the lifecycle stages may include the stages of New, Growing, Stable, Declining, Defected and/or Insignificant. The lifecycle factor may be computed by determining the absolute value of a difference of the selected measure and by multiplying the determined absolute value with a percentage measure growth of the selected measure, both the difference and the percentage measure growth being determined over two selected periods according to the selected comparison method.

36 Claims, 5 Drawing Sheets

OTHER PUBLICATIONS

Lewis, Barbara and Litter, Dale, "The Blackwell Encyclopedic Dictionary of Marketing", 1997, Blackwell Publishers, Second Edition.*

Dillon, William R., Madden, Thomas J., and Firte, Neil H., "Marketing Research in a Marketing Environment", 1987, Irwin Inc., Third Edition.*

Oppermann. Martin. "Destination threshold potential and the law of repeat visitation," Journal of Travel Research, Nov. 1998 [retrieved from Dialog].*

Pearson et al. "Transactional segmentation to slow customer defections," Marketing Management, Summer 1999 [retrieved from Dialog].*

Wyner, Gordon A. "Segmentation analysis, then and now," Marketing Research: A Magazine of Management & Applications, Winter 1995 [retrieved from Dialog].*

Hoekstra et al. "The Lifetime Value Concept in Customer-Based Marketing," Journal of Market Focused Management, 1999 [retrieved from Internet].*

* cited by examiner

FIG. 1

| File | Edit | View | Go | Help | | | | 200 |
|---|---|---|---|---|---|---|---|---|

Measure
- ● Revenue
- ○ Number of Orders
- ○ Quantity of Purchases

212

210

Comparison Method
- ● Period Over Period
- ○ Year Over Year by Period

214

First Lifecycle Period

| Period | Q1 ▶ |
|---|---|
| Year | 2000 ▶ |

216

218 — New Customer Period  [ 6 ] Months (the length of time when a customer is deemed "New")

220 — Calculation Period [ Quarter ▶ ] (the granularity level for the two comparison periods)

222 — Insignificant Level [ 5,000.00 ] (the level of purchase that makes a customer insignificant)

| Lifecycles | Measure growth | | % | | Lifecycle Factor | | # Customers |
|---|---|---|---|---|---|---|---|
| Growing | ▶ >= | ▶ + | 10.00 | AND | ▶ >= | ▶ + 6.00 | 5,602 |
| Declining | ▶ <= | ▶ - | 10.00 | AND | ▶ <= | ▶ - 3.00 | 4,791 |
| Defected | ▶ <= | ▶ - | 40.00 | AND | ▶ <= | ▶ - 7.00 | 7,088 |
| Stable | | | | | | | 7,599 |

224

226 [ Calculate Lifecycle ]   [ Save ]   [ Cancel ]

METHODS AND SYSTEMS FOR CUSTOMER LIFECYCLE DEFINITION AND CATEGORIZATION

BACKGROUND OF THE INVENTION

1. Field of the Invention

The present invention relates generally to the management of customer relationships. More specifically, the present invention relates to the definition, characterization and categorization of the current and anticipated future status of customers in terms of acquisition, retention and profitability thereof.

2. Description of the Related Art

For companies operating in today's dynamic and highly competitive markets, the development and maintenance of a comprehensive customer-oriented strategy is arguably the key to success. To maintain stability and growth of the business, companies must grow their customer base (customer acquisition), retain their existing customers (customer retention) and induce their existing customers to spend more (customer profitability). To retain and increase the profitability of customers, companies must ensure that its current customers remain loyal and satisfied with the products and services offered.

Before a customer becomes a customer, however, the new prospect most often begins the relationship with the company as a salesperson's lead. A lead may mature into an opportunity that, in time, may become a customer. Existing customers, if characterized at all, are conventionally characterized as having one of two statuses: active or cancelled/closed. Conventionally, therefore, customer relationships are characterized according to the following continuum: lead, opportunity, active customer and cancelled or closed customer.

It has become clear that this customer relationship continuum is inadequate in accurately characterizing the current status of customers and is wholly unhelpful in providing clues as to future customer behavior. An accurate characterization of the status of customers is believed to be essential, however, to allow companies to intelligently allocate their finite sales, marketing and service resources. Indeed, companies must focus their resources where they will be most effective. Without an accurate characterization of the current and anticipated future status of customer relationships, such an allocation of resources may not be carried out as effectively as it might otherwise be.

What are needed, therefore, are methods and systems for more accurately and flexibly defining the current and anticipated future status of the relationship of a company with its customers.

SUMMARY OF THE INVENTION

It is, therefore, an object of the present invention to provide methods and systems for accurately and flexibly defining the current and anticipated future status of the relationship of a company with its customers.

In accordance with the above-described objects and those that will be mentioned and will become apparent below, a method of categorizing a customer relationship may include steps selecting a measure on which the status of the customer relationship is to be analyzed; selecting a calculation period; selecting a comparison method; computing a lifecycle factor, the lifecycle factor being related to both a size and a growth of the customer according to the selected measure, both the size and growth being determined over two selected calculation periods using the selected comparison method, and categorizing the customer by evaluating a plurality of categorization criteria, at least one of the plurality of categorization criteria including the computed lifecycle factor.

According to further embodiments, the measure may be selected from a group including, for example, number of orders, quantity of purchase and revenue. The calculation period may be selected from a group including, for example, daily, weekly, monthly, quarterly, semi-annually and yearly. The comparison method may be selected from a group including, for example, period over period and year over year by period. The categorizing step may assign a customer to one of a plurality of stages according to which of the plurality of categorization criteria is satisfied. The plurality of stages may include one or more of the following: New, Growing, Stable, Declining, Defected and Insignificant and/or other user-definable stages. The New stage may be based upon a date at which an account is established for the customer. The method may also include the step of selecting the customer according to at least one of a plurality of customer selection parameters. The customer selection parameters may include market segment, customer category, operating unit and geography, for example. The geography customer selection parameter may include one or more of a plurality of geographical sub-parameters, including area, country, region, state/province and city, for example. The customer selection step may include the step of accessing a remote database wherein customer information for a plurality of customers is stored. The accessing step may access the database over a computer network, including the Internet, for example. The lifecycle factor may be computed by determining an absolute value of a difference of the selected measure and by multiplying the determined absolute value with a percentage measure growth of the selected measure, both the difference and the percentage measure growth being determined over two selected periods according to the selected comparison method.

The present invention is also a computer system configured for categorizing a customer, comprising: at least one processor; at least one data storage device; a plurality of processes spawned by said at least one processor, the processes including processing logic for: selecting a measure on which the status of the customer is to be analyzed; selecting a calculation period; selecting a comparison method; computing a lifecycle factor, the lifecycle factor being related to both a size and a growth of the customer according to the selected measure, both the size and growth being determined over two selected calculation periods using the selected comparison method, and categorizing the customer by evaluating a plurality of categorization criteria, at least one of the plurality of categorization criteria including the computed lifecycle factor.

Alternately, the present invention may also be viewed as a machine-readable medium having data stored thereon representing sequences of instructions which, when executed by computing device, causes said computing device to categorize a customer by performing the steps of selecting a measure on which the status of the customer is to be analyzed; selecting a calculation period; selecting a comparison method; computing a lifecycle factor, the lifecycle factor being related to both a size and a growth of the customer according to the selected measure, both the size and growth being determined over two selected calculation periods using the selected comparison method, and categorizing the customer by evaluating a plurality of categorization criteria, at least one of the plurality of categorization criteria including the computed lifecycle factor.

DESCRIPTION OF THE INVENTION

Functional Description

The present invention recognizes that the relationship between a company and its customers is more complex than merely active or closed. Indeed, the relationship of a company with its customers is believed to be both more complex than merely active or closed and more dynamic—the relationship is subject to change and most often evolves during the lifetime of the relationship. For instance, the relationship could be a new one, could be growing, could be stable or could be declining. Moreover, the customer may have defected to a competitor without having informed the company of its defection, in which case the defection may be inferred from the customer's recent historical transactional data. In other cases, the customer might be technically be said to be growing or declining, but may be purchasing in such small amounts that the customer is relatively insignificant, as compared with the company's other customers. The present invention, therefore, categorizes a company's customer(s) into at least one lifecycle stage including, for example, Growing, Declining, Defected, Stable, Insignificant and New. Other lifecycle stages may also be defined within the context of the present invention and the present invention is not to be limited by the above-enumerated lifecycle stages.

Figure 1:
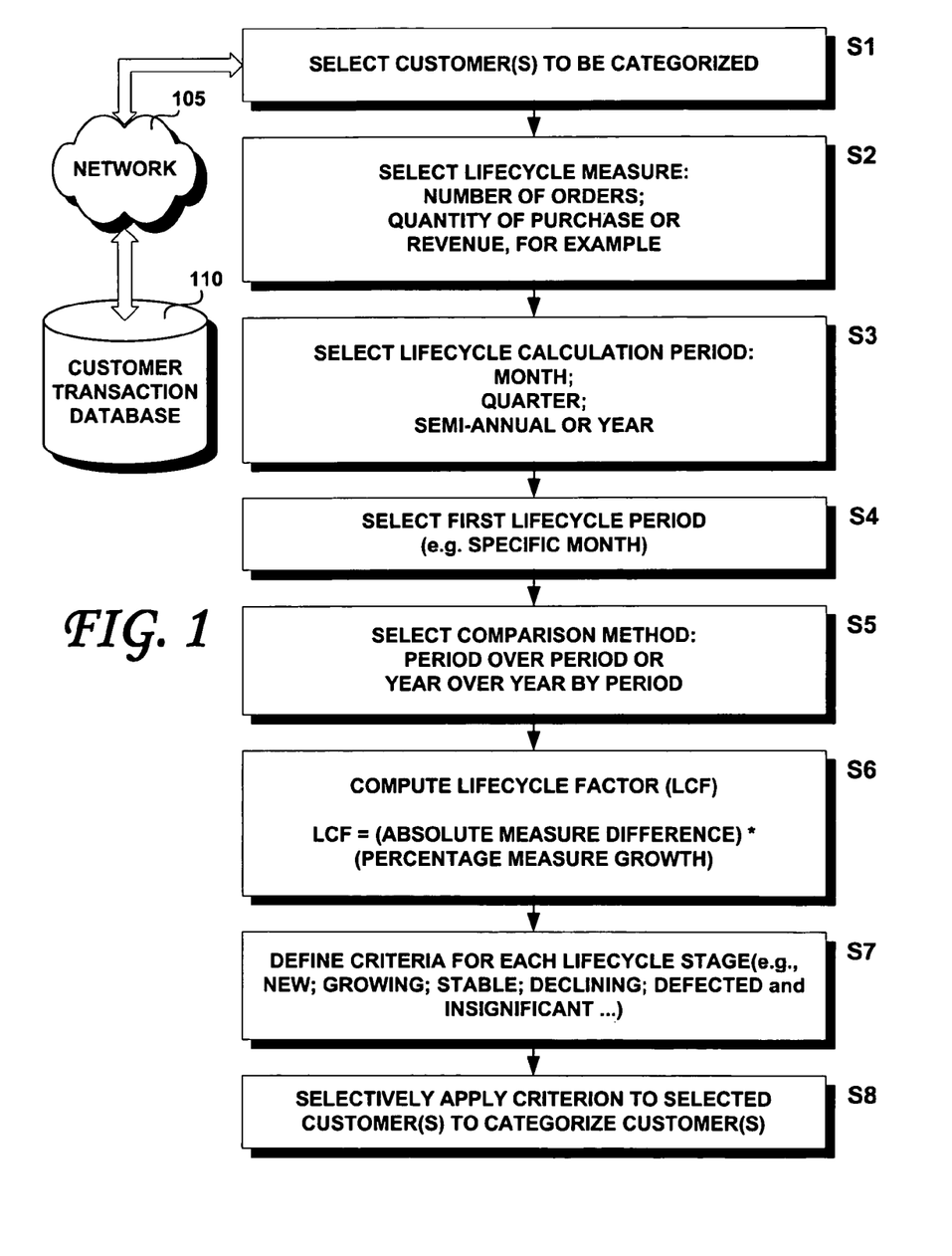
FIG. 1 is a flowchart of the method for categorizing a customer relationship, according to an embodiment of the present invention.

FIG. 1 is a flowchart of the computer-implemented method for categorizing a customer, according to an embodiment of the present invention. As shown therein, step S1 calls for the selection of a customer or customers to be categorized. According to the present invention, the customer or customers may be selected according to one or more of a plurality of customer selection parameters such as, for example, the customer market segment, the customer category, the customer operating unit, geography (country, region, state/province and city, for example), or operating period. The selection step shown at S1 in FIG. 1 may also include the step of accessing one or more (remote, for example) databases 110 in which the company's customer information is stored. The accessing step may be carried out over a computer network 105 including, for example, a corporate network and/or the Internet. In step S2, a lifecycle measure is selected for purposes of categorization. According to an embodiment of the present invention, the lifecycle measure may be selected from stored customer transaction data (data relating to the customer's historical interaction with the company). The transaction data may be stored in a database (such as shown at 110) accessible to an application implementing the computer-implemented method disclosed herein. For example, the available lifecycle measures may include Number of Orders, Quantity of Purchase or Revenue. The Number of Orders lifecycle measure may be defined as the total number of orders placed by the customer, the Quantity of Purchase measure may be defined as the total number of items purchased (one order may contain many items) and the Revenue lifecycle measure may be defined as the total money (or equivalent quantifiable value) received by the company through sales of products and/or services to the customer. Other lifecycle measures may be defined and selected in step S2, as appropriate for the company's business field and/or other considerations.

As shown in step S3, the lifecycle calculation period may then be selected. According to an embodiment of the present invention, the lifecycle calculation period may be selected, for example, from among the following: Month, Quarter, Semi-Annual or Year, these being the most commonly used business cycles. However, other lifecycle calculation periods may also be selected according to the present invention. For example, in high daily volume businesses, a Daily, Weekly or Bi-Monthly lifecycle calculation period may be selected, the present invention not being limited to the three exemplary lifecycle calculation periods shown in step S3 of FIG. 1. Still other custom-defined lifecycle calculation periods may be defined. According to the present invention, the customer may be categorized by evaluating a plurality of categorization criteria, wherein the categorizing step assigns the customer to one of a plurality of stages according to which of the plurality of categorization criteria evaluates true. One or more of the categorization criteria may include a comparison of the same lifecycle measure from two lifecycle calculation periods. By selecting the lifecycle calculation period (Daily, Weekly, Bi-Monthly, Monthly, Quarterly, Semi-Annually or Yearly, for example), the granularity level of the two lifecycle comparison periods may be freely chosen. A smaller granularity in the selection of the lifecycle calculation period (Monthly, for example) would allow those in managerial positions within the company to respond to changing customer relationships in a timely manner, i.e., fast enough to affect the changing relationship through prompt action (increased sales efforts, aggressive marketing, increased customer support, personal visit, targeted incentive programs, etc.).

Step S4 calls for the selection of the first lifecycle period, such as a specific month, quarter or year for example. The first lifecycle period must be selected, as lifecycle stages are computed, according to the present invention, on a periodic basis by the comparison of two lifecycle calculation periods. The selected first lifecycle period, therefore, serves as a basis for the comparison. As shown in step S5, a comparison method may be selected such as, for example, Period Over Period or Year Over Year by Period. Other comparison methods may readily be defined and implemented within the scope of the present invention. Selection of the Period Over Period comparison method, according to the present invention, causes the selected lifecycle measure (say, Revenue, for example) to be compared over the selected lifecycle calculation period (say Quarterly, for example). In this example, the comparison would then compare Q2-99 revenue versus Q1-99 revenue, for example, assuming the first lifecycle period is selected to be the first quarter (Q1) of 1999. Keeping with the Period Over Period example developed above, should the lifecycle measure be selected to be Number of Orders, the lifecycle calculation period be selected to be Monthly and the first lifecycle period be selected to be the month of February of 1999, the comparison would then compare the number of orders received from the selected customer(s) in March 1999 versus the number of orders received from the same selected customer(s) in February 1999.

Another comparison method shown in FIG. 1 is the Year Over Year by Period comparison method. If the selected lifecycle measure is Revenue, the selected lifecycle calculation period is Quarterly and the selected first lifecycle period is Quarter 2 of 1998 (Q2-98), then selection of the Year Over Year by Period comparison method would result in the revenue generated by the selected customer(s) in Q2-99 being compared with the revenue generated by the same customer(s) during Q2-98. Keeping with the Year Over Year by Period example developed above, should the lifecycle measure be selected to be Quantity of Purchases, the lifecycle calculation period be selected to be Monthly and the first lifecycle period be selected to be the month of March 1998, the comparison would then compare the quantity of purchases made by the selected customer(s) in March 1999 versus the quantity of purchases made by the same selected customer(s) in March 1998. The comparison may be made arbitrarily specific by further by restricting the comparison to specific goods or services, classes of goods or services or any other logical compartmentalization of the customer transaction data stored in the database(s) 110.

A lifecycle factor (LCF) may then be computed, the lifecycle factor being related the size of the customer and the growth thereof according to the selected lifecycle measure. Both the size and growth may be determined over two of the calculation periods selected in step S3 and using the comparison method selected in step S5. The LCF, therefore, may be computed by determining the absolute value of the difference of the selected measure over two selected calculation periods according to the selected comparison method (yielding a scalar representing size) and by multiplying the determined absolute value with a percentage measure growth of the selected measure over two selected calculation periods (signed quantity representing growth), also according to the selected comparison method. Table 1 illustrates several examples of the computation of the LCF, assuming the selected measure is Revenue:

TABLE 1

| Cust # | Period 1 Rev. | Period 2 Rev. | Abs. Diff. | % Growth | LCF |
|---|---|---|---|---|---|
| 1 | 100 | 50 | 50 | −50% | −25 |
| 2 | 10 | 5 | 5 | −50% | −2.5 |
| 3 | 50 | 100 | 50 | 100% | 50 |
| 4 | 5 | 10 | 5 | 100% | 5 |

The Period 1 and Period 2 of Table 1 are determined according to the selected calculation period (Quarterly, for example), using the selected comparison method (Year to year by Period, for example). For example, Period 1 may represent the revenue (Revenue is the selected measure in this example) generated by the selected customer(s) during Q3-99, whereas Period 2 may represent the revenue generated during Q3-00, in thousands of dollars, for example.

In step S7, criteria for each lifecycle stage (for example, New, Growing, Stable, Declining, Defected and Insignificant, for example) may be defined. The criteria may, for example, include a Boolean expression (or expressions) that evaluate to True or False, may include mathematical operators and/or may include date-based expressions, for example. The customer may be categorized into one of the lifecycle stages depending upon which of the criteria is satisfied upon the application of transaction data thereto, as shown at step S8. For example, a customer may be categorized as New if the customer's account was created after a user selectable date. The criteria for categorizing a customer in the New lifecycle stage may include a test wherein the customer's account creation date is tested against the user selectable date. If the customer's account was created before the user selectable date, the customer is not categorized in the New lifecycle stage. If, however, the customer's account was created after the user selectable date, the customer is categorized, according to the present invention, in the New lifecycle stage. A customer may be categorized in the Insignificant lifecycle stage, for example, if the selected measures (say, Revenue) in both calculation periods fall below a selectable value. For example, the criteria for categorizing a customer as Insignificant may be defined so that the Revenue generated through sales of goods and/or service to the customer must be less than $5,000 (the selectable value) in both calculation periods. In that case, if the revenue numbers derived from this customer in both calculation periods fall below $5,000, then this customer will be categorized as belonging to the Insignificant lifecycle stage.

According to the present invention, at least one of the criteria includes the computed lifecycle factor. For example, the criteria for categorizing the selected customer(s) in the Growing lifecycle stage may include a Boolean expression (one that includes a logical operator such as AND, OR, XOR, etc.) that includes the computed LCF and the calculated growth of the selected measure over the selected calculation period using the selected comparison method. For purposes of illustration only, such a criteria may be defined as the expression: LCF>=6 AND Growth>=10%. To satisfy this illustrative criterion and be categorized as a customer belonging to the Growing lifecycle stage, a customer's computed LCF must be greater or equal to 6 and the revenue growth attributable to the customer must be greater or equal to 10%. For example, customer 3 of Table 1 would satisfy this criterion and be categorized, in step S8, as belonging to the Growing lifecycle stage. Boolean operators other than the AND operator may be used, such as OR, XOR (exclusive OR). One of the lifecycle stages may be defined as a default stage when, for example, none of the other criteria are satisfied. Table 2 below is an example of how parameters such as account creation date, lifecycle measure, growth of the selected lifecycle measure and LCF may be combined to determine a customer's lifecycle stage, according to the present invention.

TABLE 2

| Lifecycle Stage | Sample Criteria | Number of Customers |
|---|---|---|
| New | Accounts Created after Apr. 1, 1998 | 705,417 |
| Insignificant | P1 Revenue <5 AND P2 growth <5 | 736,936 |
| Growing | LCF >=6 & Rev. Growth >=10% | 915,843 |
| Defected | LCF <=−7 AND Rev. Growth <=−40% | 423,120 |
| Declining | LCF <=−3 AND Rev. Growth <=−10% | 473,498 |
| Stable | All other accounts | 996,853 |

Other combinations of Boolean operators, lifecycle measures, LCF and/or other customer transaction data may be used to categorize selected customers into one of the above-listed lifecycle stages and/or other user-definable lifecycle stages. It is to be noted that steps S1 through S8 may be carried out in an order that differs from that shown in FIG.

1. For example, step S4 may be carried out before step S3 or step S3 could be carried out after step S5, as those of skill may recognize.

Figure 2:
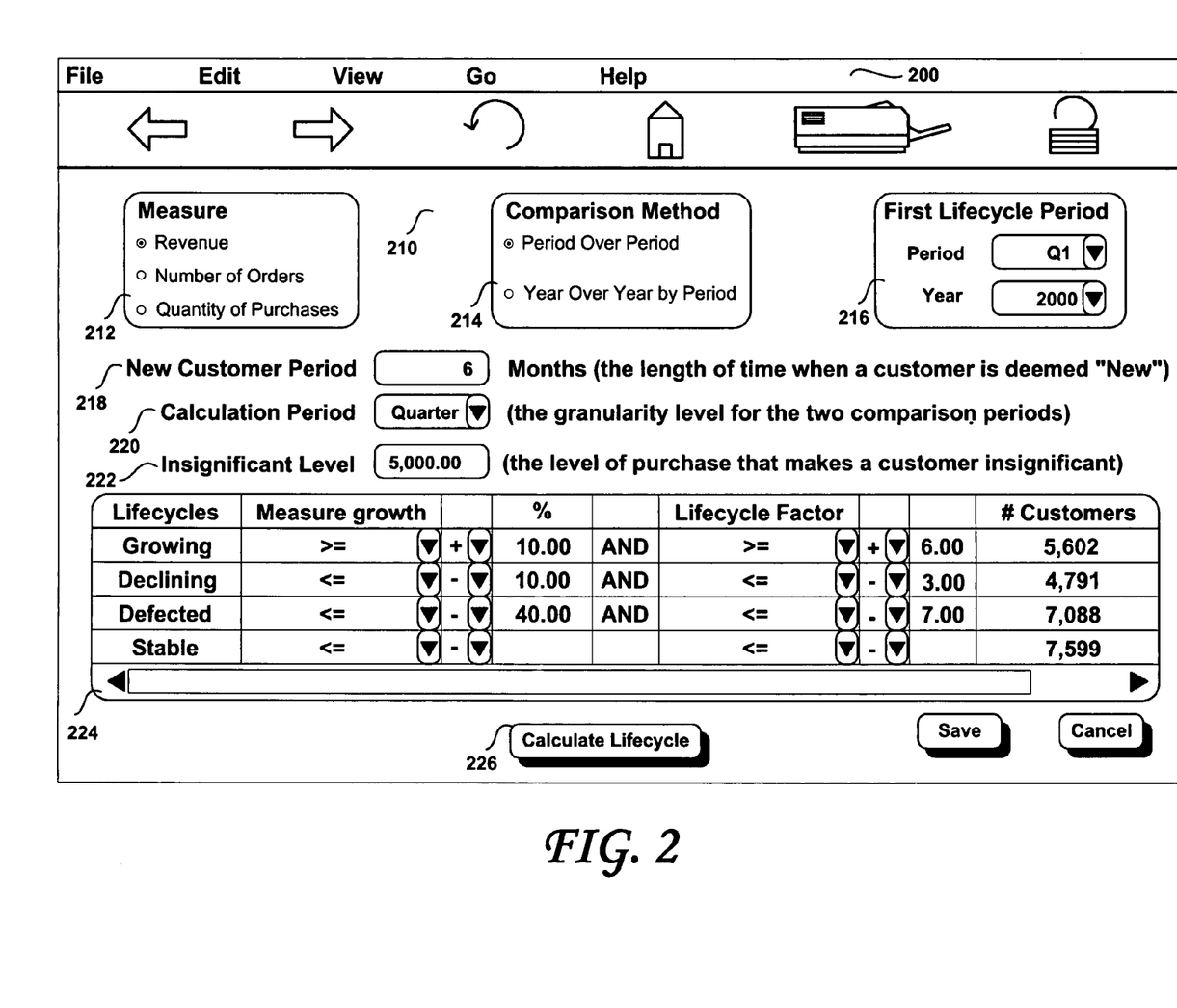
FIG. 2 is diagram illustrating the setup process for the methods and systems for customer categorization, according to an embodiment of the present invention.

FIG. 2 illustrates an example of a possible user interface for the setup process for the computer-implemented method of categorizing customers, according to an embodiment of the present invention. FIG. 2 shows browser 200, such as Netscape Navigator® or Microsoft Internet Explorer®, upon which an application 210 embodying the present invention may be run. The application may include a window 212 to select the lifecycle measure, a window 214 to select the comparison method and a window 216 to select the first lifecycle period, as detailed above with respect to FIG. 1 and steps S1, S5 and S4, respectively. The setup process may also include an input field 218 for defining the length of time in which a customer is considered to belong to the New lifecycle stage, an input field 220 for selecting the lifecycle calculation period, as detailed with respect to step S3 of FIG. 1 and an input field 222 for defining the level of the selected measure (in this case, the Revenue measure is selected in window 212) that causes the selected customer(s) to be categorized in the Insignificant lifecycle stage. Another window 224 mimics Table 2 above, allowing the user to flexibly define criteria that will be applied to the transaction data of the selected customer(s) in the manner discussed above relative to step S7 and Table 2. The inverted triangles in FIGS. 2–4 denote pull down menus, as is known in the art. For example, clicking or otherwise selecting the pull down menu of input field 220 would reveal other lifecycle calculation periods such as Month, Semi-Annual or Year, for example. Finally, a button 226 allows the user to initiate the application of the criteria defined in window 224 to the customer transaction data in the manner discussed above relative to step S8.

Figure 3:
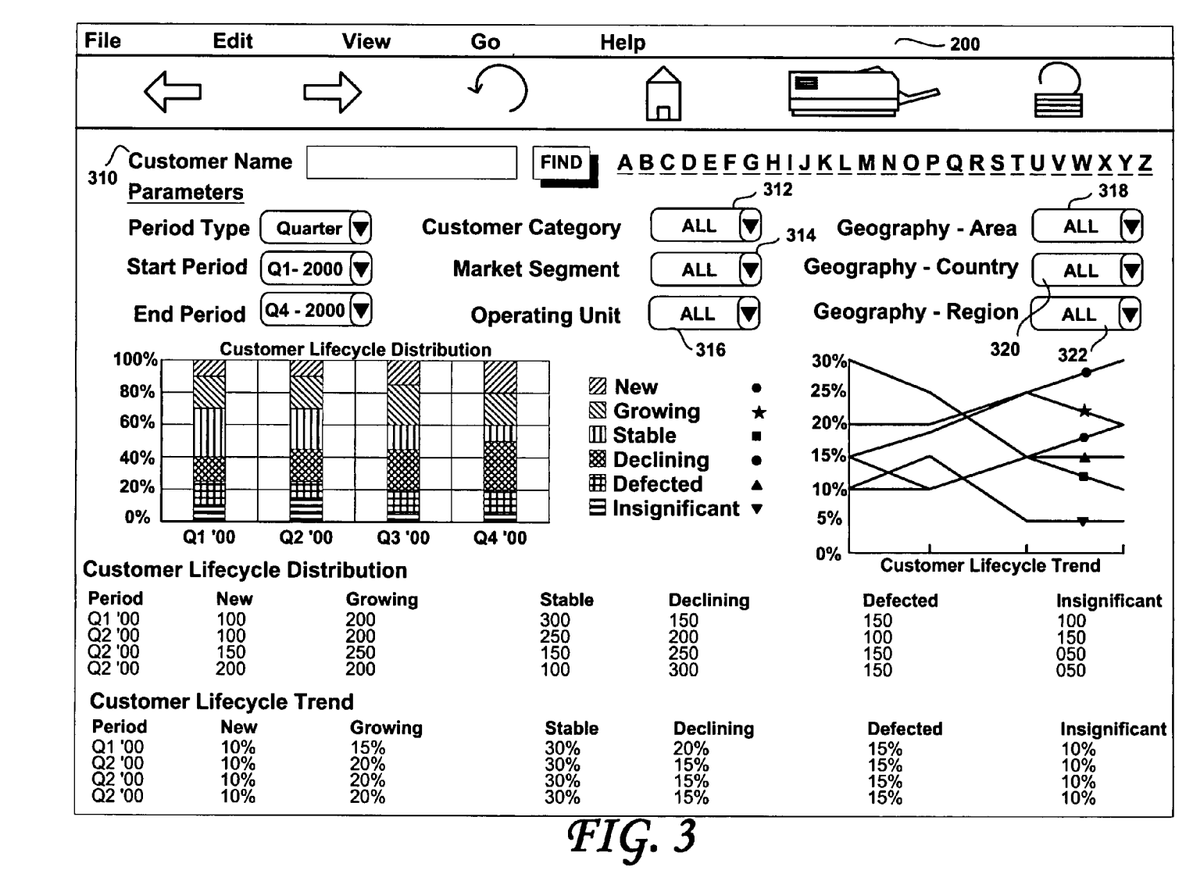
FIG. 3 is a diagram illustrating an exemplary report following the application of the method for customer categorization to selected customer data, according to an embodiment of the present invention.
Figure 4:
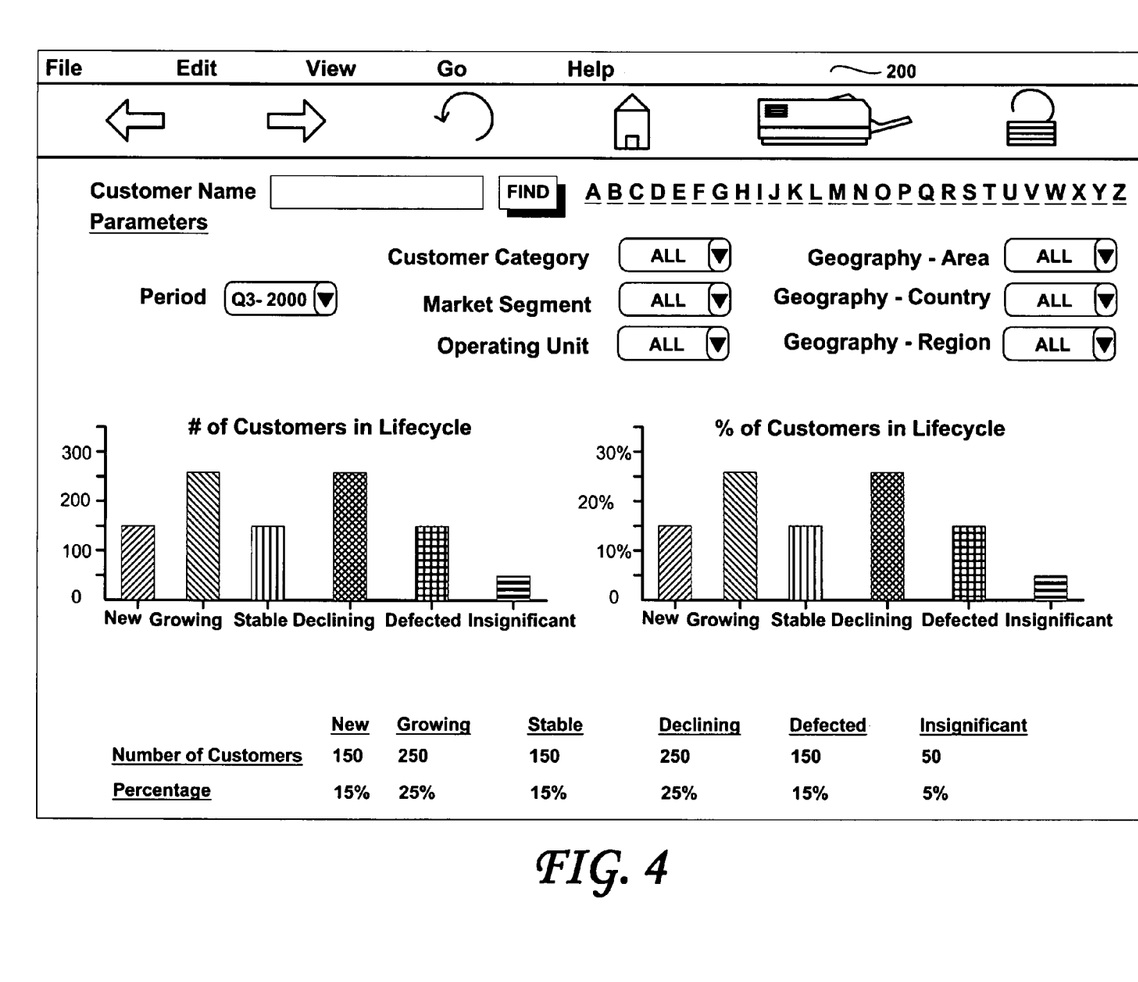
FIG. 4 is a diagram illustrating another exemplary report following the application of the method for customer categorization to selected customer data, according to an embodiment of the present invention.

FIG. 3 is a diagram illustrating an exemplary report following the application of the method for categorizing customers, according to an embodiment of the present invention. FIG. 4 is a diagram illustrating another exemplary report following the application of the method for customer categorization, also according to an embodiment of the present invention. FIG. 3 shows the browser 200 displaying the results of the application of the criteria to selected customers of the deploying company; i.e., the company that owns the customer transaction data and runs the application embodying the computer implemented method of the present invention. As shown at 310, a specific customer may be selected by entering the customer's name in the input field provided, or the user may select a customer or customers alphabetically by clicking on or otherwise selecting the appropriate underlined letter. The user may also select customers to categorize by selecting one or more customer parameters, such as shown by the customer category pull down window 312, the market segment pull down window 314, the operating unit 316, the customer's geographic area pull down window 318, the customer's country pull down window 320 and/or the customer's geographic region pull down window 320, for example. Other or different pull down windows may be provided, with respectively different customer parameters. The lower half of FIG. 3 and FIG. 4 show different representations of the customer categorization according to the present invention. As shown in FIG. 3, the left hand graphic is a lifecycle distribution graph, showing the percentage distribution of the company's selected customers in the defined lifecycle stages over four selected quarters (Q1-00 through Q4-00). The legends for the graphics of FIG. 3 identifying the lifecycle stages are shown between the two graphs. The right hand graphic of FIG. 3 represents the lifecycle trend of the company's selected customers over the same four quarters. This graphic may give the company's decision makers with possible clues as to the future status of the selected customers' relationship with the company. Armed with such intelligence, the decision makers may take corrective action and/or confirm whether the desired relationship has indeed developed or is developing. The corresponding numerical data is shown below the two graphs of FIG. 3.

FIG. 4 shows other graphical representations of the customer categorization data obtained by applying the method according to the present invention to customer transaction data, again on a browser 200. The left hand graphic is a representation of the number of the selected customers in each lifecycle stage, whereas the right hand graph shows the percentage of customers in each lifecycle stage, using the same numerical customer data represented in FIG. 3. The corresponding numerical data is again shown below the graphics of FIG. 4. The customer categorization data may be graphically or numerically represented in ways not disclosed herein. However, all such alternate customer categorization data representations are deemed to fall within the scope of the present invention and are expressly included herein by reference.

Hardware Description

Figure 5:
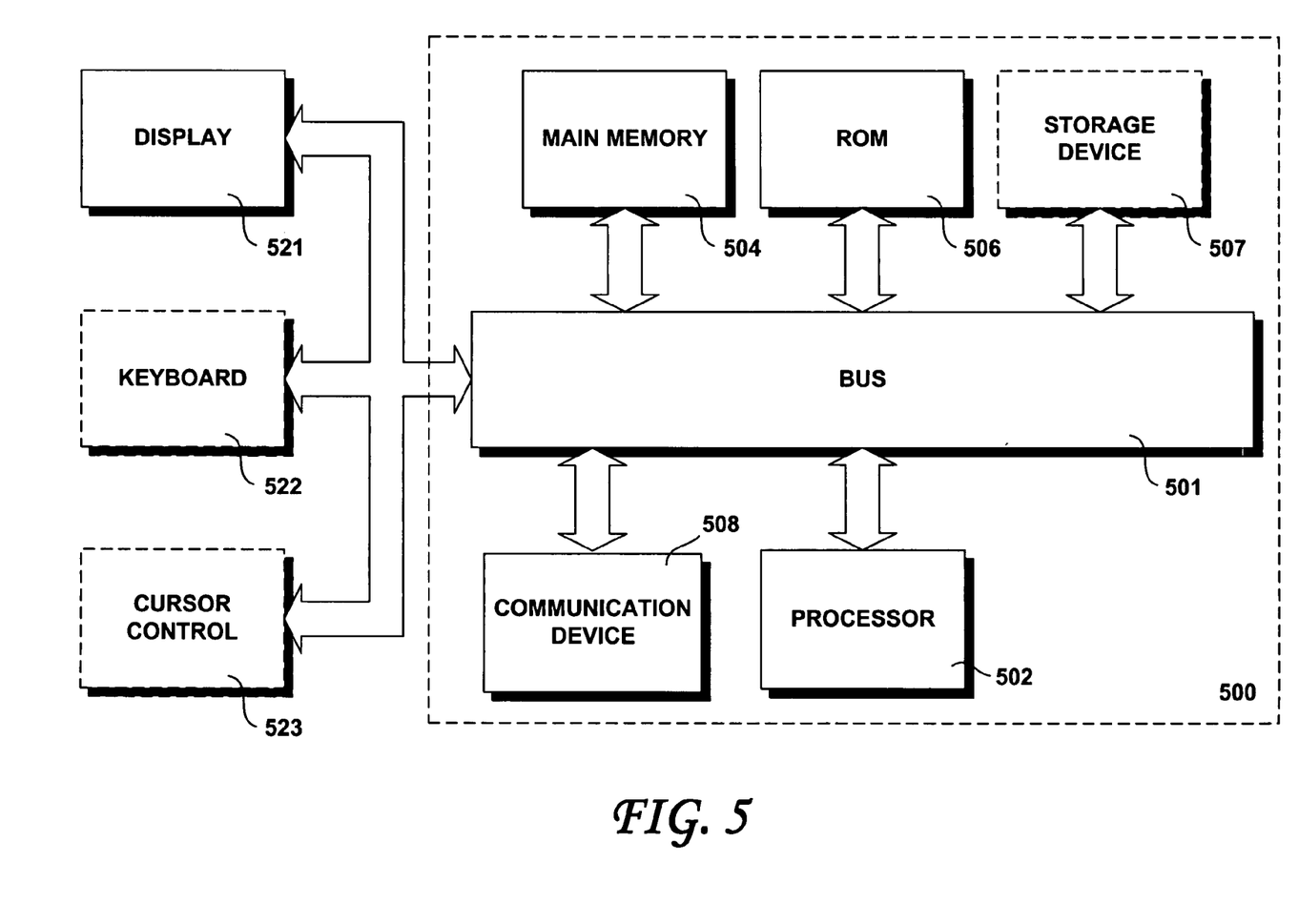
FIG. 5 is a block diagram of a computing device with which the methods of the present invention may be implemented.

FIG. 5 illustrates a block diagram of a computing device 500 with which an embodiment of the present invention may be implemented. Examples of such computing devices are shown at reference numeral 218 and 219 in FIG. 2. Computing device 500 includes a bus 501 or other communication mechanism for communicating information, and a processor 502 coupled with bus 501 for processing information. Computing device 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computing device 500 may also include a read only memory (ROM) and/or other static storage device 506 coupled to bus 501 for storing static information and instructions for processor 502. A data storage device 507, such as a magnetic disk or optical disk, may be coupled to bus 501 for storing information and instructions. A communication device 508, such as a modem or network (such as Ethernet, for example) card is also coupled to the bus 501 to provide access to a network, such as shown at 512 in FIG. 5.

The computing device 500 may also be coupled via bus 501 to a display device 521, such as a cathode ray tube (CRT), for displaying information to a computer user. An alphanumeric input device 522, including alphanumeric and other keys, is typically coupled to bus 501 for communicating information and command selections to processor 502. Another type of user input device may be user's own voice or cursor control 523, such as a mouse, a trackball, or cursor direction keys for communicating direction information and command selections to processor 502 and for controlling cursor movement on display 521.

The present invention is related to the use of computing device 500 to share a shopping cart over a computer network 212, such as the Internet. According to one embodiment, the sharing is carried out by one or more computing devices 500 in response to processor(s) 502 executing sequences of instructions contained in memory 504. Such instructions may be read into memory 504 from another computer-readable medium, such as data storage device 507 and/or from a remotely located server. Execution of the sequences of instructions contained in memory 504 causes processor(s) 502 to implement the cart sharing functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of categorizing an individual customer, comprising the steps of:
    selecting and storing in a computer a measure on which the status of the individual customer is to be analyzed;
    selecting and storing in the computer a calculation period;
    computing, on the computer, a lifecycle factor for the individual customer, the lifecycle factor being computed by determining an absolute value of a difference of the selected measure and by multiplying the determined absolute value with a percentage measure growth of the selected measure, both the difference and the percentage measure growth being determined over two selected historical periods within the selected calculation period, and
    categorizing, on the computer, the individual customer by evaluating a plurality of categorization criteria, at least one of the plurality of categorization criteria including the computed lifecycle factor.

2. The method of claim 1, wherein the measure is selected from a group including number of orders, quantity of purchase and revenue attributable to the individual customer.

3. The method of claim 1, wherein the calculation period is selected from a group including daily, weekly, monthly, quarterly, semi-annually and yearly.

4. The method of claim 1, wherein the categorizing step assigns a customer to one of a plurality of stages according to which of the plurality of categorization criteria is satisfied.

5. The method of claim 4, wherein the plurality of stages includes at least one of New, Growing, Stable, Declining, Defected and Insignificant.

6. The method of claim 5, wherein the New stage is based upon a date at which an account is established for the customer.

7. The method of claim 1, further comprising the step of selecting the customer according to at least one of a plurality of customer selection parameters.

8. The method of claim 7, wherein the customer selection parameters include market segment, customer category, operating unit and geography.

9. The method of claim 8, wherein the geography customer selection parameter includes at least one of a plurality of geographical sub-parameters, including area, country, region, state/province and city.

10. The method of claim 7, wherein the customer selection step includes the step of accessing a remote database wherein customer information for a plurality of customers is stored.

11. The method of claim 10, wherein the accessing step accesses the database over a computer network.

12. The method of claim 11, wherein the computer network includes the Internet.

13. A computer system configured for categorizing an individual customer, comprising:
    at least one processor;
    at least one data storage device;
    a plurality of processes spawned by said at least one processor, the processes including processing logic for:
    selecting and storing in the data storage device a measure on which the status of the individual customer is to be analyzed;
    selecting and storing in the data storage device a calculation period;
    computing a lifecycle factor for the individual customer, the lifecycle factor being computed by determining an absolute value of a difference of the selected measure and by multiplying the determined absolute value with a percentage measure growth of the selected measure, both the difference and the percentage measure growth being determined over two selected historical periods within the selected calculation period, and
    categorizing the individual customer by evaluating a plurality of categorization criteria, at least one of the plurality of categorization criteria including the computed lifecycle factor.

14. The computer system of claim 13, wherein the measure is selected from a group including number of orders, quantity of purchase and revenue attributable to the individual customer.

15. The computer system of claim 13, wherein the calculation period is selected from a group including daily, weekly, monthly, quarterly, semi-annually and yearly.

16. The computer system of claim 13, wherein the categorizing processing logic is further configured to assign a customer to one of a plurality of stages according to which of the plurality of categorization criteria is satisfied.

17. The computer system of claim 16, wherein the plurality of stages includes at least one of New, Growing, Stable, Declining, Defected and Insignificant.

18. The computer system of claim 17, wherein the New stage is based upon a date at which an account is established for the customer.

19. The computer system of claim 13, wherein the processes further include processing logic for selecting the customer according to at least one of a plurality of customer selection parameters.

20. The computer system of claim 19, wherein the customer selection parameters include market segment, customer category, operating unit and geography.

21. The computer system of claim 20, wherein the geography customer selection parameter includes at least one of a plurality of geographical sub-parameters, including area, country, region, state/province and city.

22. The computer system of claim 19, wherein the customer selection processing logic is further configured to access a remote database wherein customer information for a plurality of customers is stored.

23. The computer system of claim 22, wherein the customer selection processing logic is further configured to access the database over a computer network.

24. The computer system of claim 23, wherein the computer network includes the Internet.

25. A machine-readable medium having data stored thereon representing sequences of instructions which, when executed by a computing device, causes said computing device to categorize an individual customer by performing the steps of:

selecting and storing in the computing device a measure on which the status of the individual customer is to be analyzed;

selecting and storing in the computing device a calculation period;

computing a lifecycle factor for the individual customer, the lifecycle factor being computed by determining an absolute value of a difference of the selected measure and by multiplying the determined absolute value with a percentage measure growth of the selected measure, both the difference and the percentage measure growth being determined over two selected historical periods within the selected calculation period, and categorizing the individual customer by evaluating a plurality of categorization criteria, at least one of the plurality of categorization criteria including the computed lifecycle factor.

26. The medium of claim 25, wherein the measure is selected from a group including number of orders, quantity of purchase and revenue attributable to the individual customer.

27. The medium of claim 25, wherein the calculation period is selected from a group including daily, weekly, monthly, quarterly, semi-annually and yearly.

28. The medium of claim 25, wherein the categorizing step assigns a customer to one of a plurality of stages according to which of the plurality of categorization criteria is satisfied.

29. The medium of claim 28, wherein the plurality of stages includes at least one of New, Growing, Stable, Declining, Defected and Insignificant.

30. The medium of claim 29, wherein the New stage is based upon a date at which an account is established for the customer.

31. The medium of claim 25, further comprising the step of selecting the customer according to at least one of a plurality of customer selection parameters.

32. The medium of claim 31, wherein the customer selection parameters include market segment, customer category, operating unit and geography.

33. The medium of claim 32, wherein the geography customer selection parameter includes at least one of a plurality of geographical sub-parameters, including area, country, region, state/province and city.

34. The medium of claim 31, wherein the customer selection step includes the step of accessing a remote database wherein customer information for a plurality of customers is stored.

35. The medium of claim 34, wherein the accessing step accesses the database over a computer network.

36. The medium of claim 35, wherein the computer network includes the Internet.

* * * * *